United States Patent [19]

Kamoshita

[11] Patent Number: 5,204,853
[45] Date of Patent: Apr. 20, 1993

[54] ADAPTOR FOR A DISC CARTRIDGE CASE

[75] Inventor: Yasuhiko Kamoshita, Hamamatsu, Japan

[73] Assignee: Yamaha Corporation, Hamamatsu, Japan

[21] Appl. No.: 316,238

[22] Filed: Feb. 27, 1989

[30] Foreign Application Priority Data

Feb. 29, 1988 [JP] Japan .................... 63-25230[U]

[51] Int. Cl.⁵ ............................................. G11B 23/00
[52] U.S. Cl. .................................. 369/289; 369/290; 369/270
[58] Field of Search ............................ 369/270–272, 369/277, 289–292; 360/133

[56] References Cited

U.S. PATENT DOCUMENTS

| | | | |
|---|---|---|---|
| 2,285,139 | 6/1942 | Andres | 274/42 |
| 2,646,284 | 7/1953 | Weingarden | 274/9 |
| 3,201,133 | 8/1965 | Matsukata | 366/289 |
| 4,730,300 | 3/1988 | Kamoshita et al. | 369/270 |
| 4,731,779 | 3/1988 | Mathunaga | 369/270 |
| 4,768,185 | 8/1988 | Camerik | 369/270 |
| 4,881,218 | 11/1989 | Yamamori | 369/289 |
| 4,899,330 | 2/1990 | Einhaus | 369/289 |

FOREIGN PATENT DOCUMENTS

0238350 9/1987 European Pat. Off.
0288900 11/1988 European Pat. Off.

Primary Examiner—William M. Shoop, Jr.
Assistant Examiner—David Martin
Attorney, Agent, or Firm—Spensley Horn Jubas & Lubitz

[57] ABSTRACT

An adaptor for setting a disc which is of a smaller diameter than a standard type disc, such as an 8-cm Compact Disc, in a disc playback device such as a standard type Compact Disc player is detachably mounted in a disc housing space of a disc cartridge case, which disc housing space receives a disc in such a manner that it can be replaced and played back therein. The adaptor includes a central opening for receiving a disc of a small diameter therein in such a manner that this disc is roughly positioned and held in the central portion of the disc housing space so as to enable this disc to be set on a turntable of the disc playback device when the adaptor is mounted in the disc housing space of the disc cartridge case. The adaptor also includes a self positioning device for positioning the adaptor with respect to the disc cartridge case so that the adaptor will be held in a position in which the adaptor is not in contact with the disc when the disc is set on the turntable. The adaptor facilitates attaching and detaching of the disc and resolves the problem of disengagement of the adaptor from the disc during playback of the disc.

6 Claims, 11 Drawing Sheets

ADAPTOR FOR A DISC CARTRIDGE CASE

BACKGROUND OF THE INVENTION

This invention relates to an adaptor for setting a disc which is of a smaller diameter than a standard type disc, such as an 8-cm Compact Disc, in a disc playback device such as a standard type Compact Disc player and, more particularly, to an adaptor of such type capable of attaching the detaching a disc easily and also capable of preventing disengagement of the adaptor from a disc.

A Compact Disc in the Compact Disc Digital Audio System (hereinafter abbreviated as "CD") has an outer diameter of 12 cm. There is however a CD of a smaller diameter of 8 cm which is called an 8-cm CD. If this 8-cm CD is played back by a standard CD player, there arise inconveniences such as that a disc is damaged during loading or unloading and that it sometimes does not come out of the CD player. For overcoming such inconveniences, there have been proposed various adaptors which are attached to an 8-cm CD so as to substantially enlarge its outer diameter to 12 cm and thereby enable the 8-cm CD to be handled in the same manner as the standard type CD.

Figure 2:
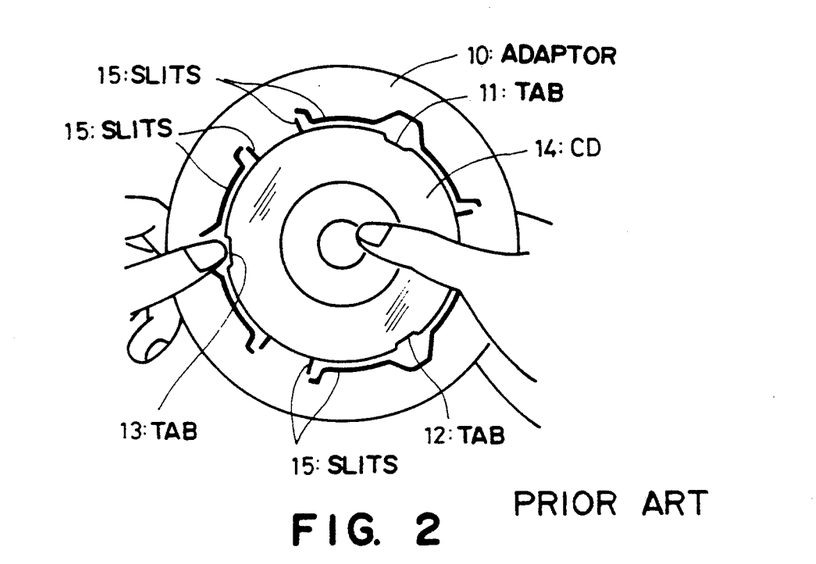
FIG. 2 is a view showing the manner of attaching an 8-cm CD to a prior art 8-cm CD adaptor.
Figure 3:
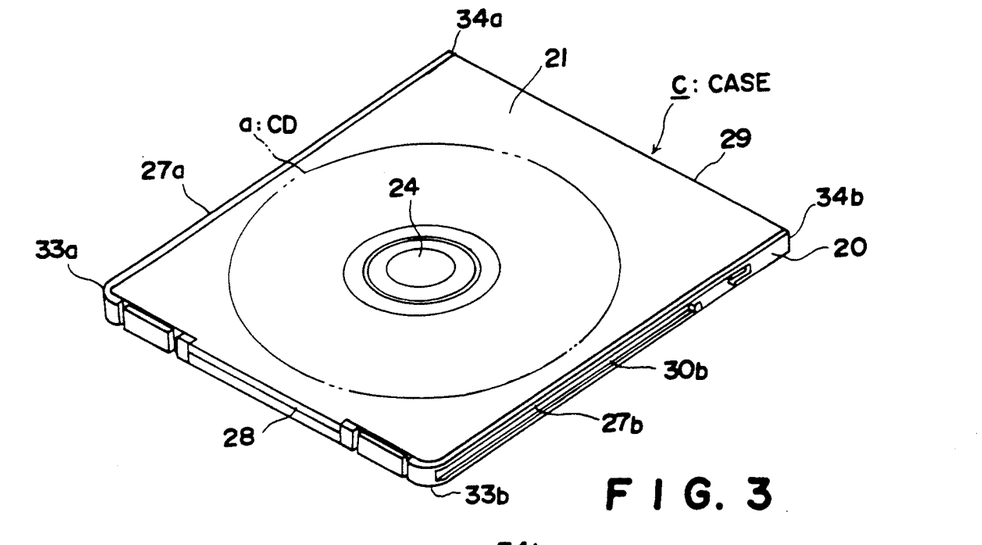
FIG. 3 is a perspective view showing an upper side of a CD cartridge case to which the adaptor of FIG. 1 is attached.
Figure 4:
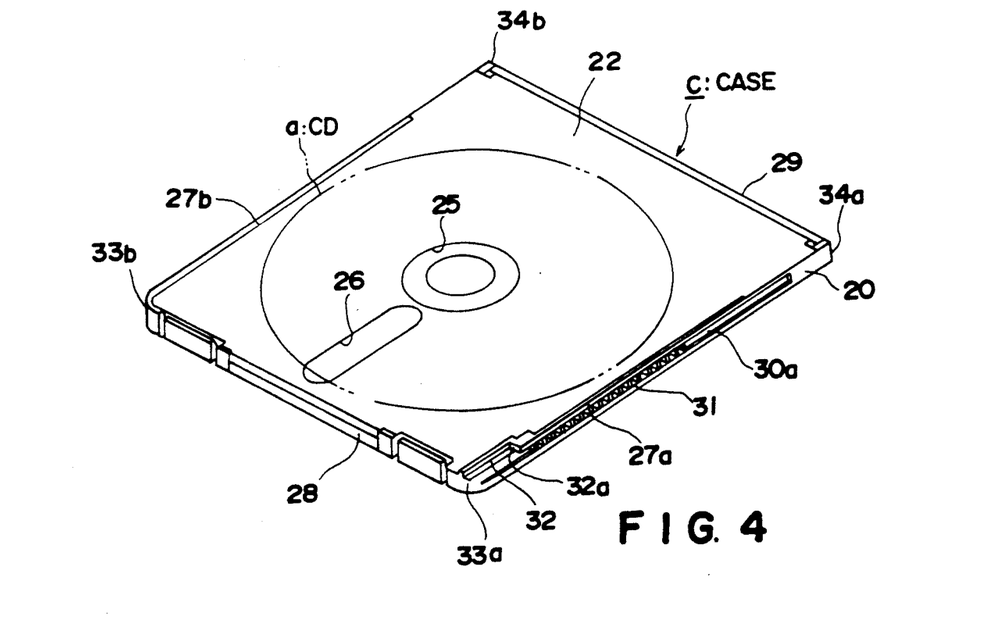
FIG. 4 is a perspective view showing a lower side of the CD cartridge case.
Figure 5:
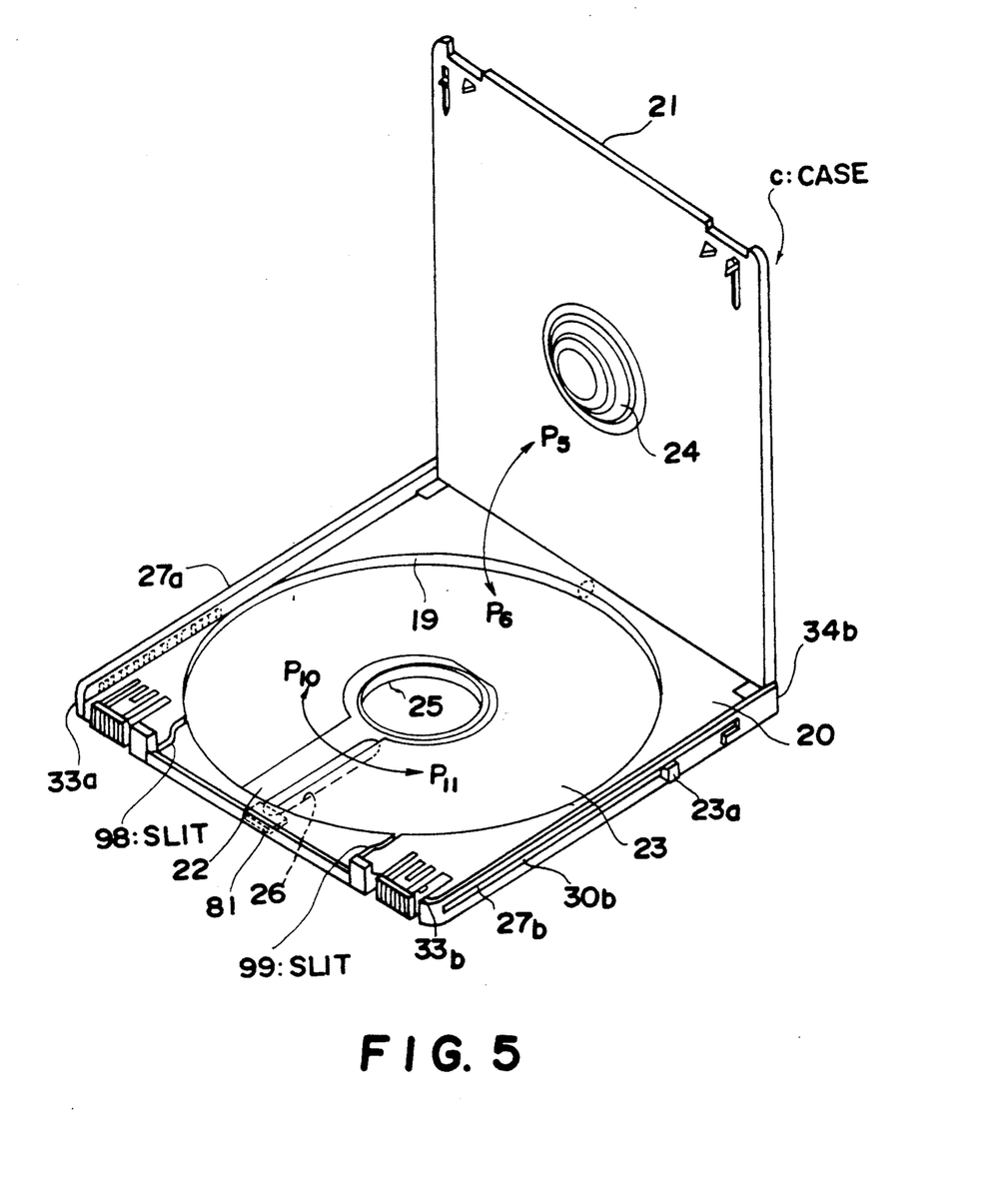
FIG. 5 is a perspective view showing this case with its case lid being opened.
Figure 6:
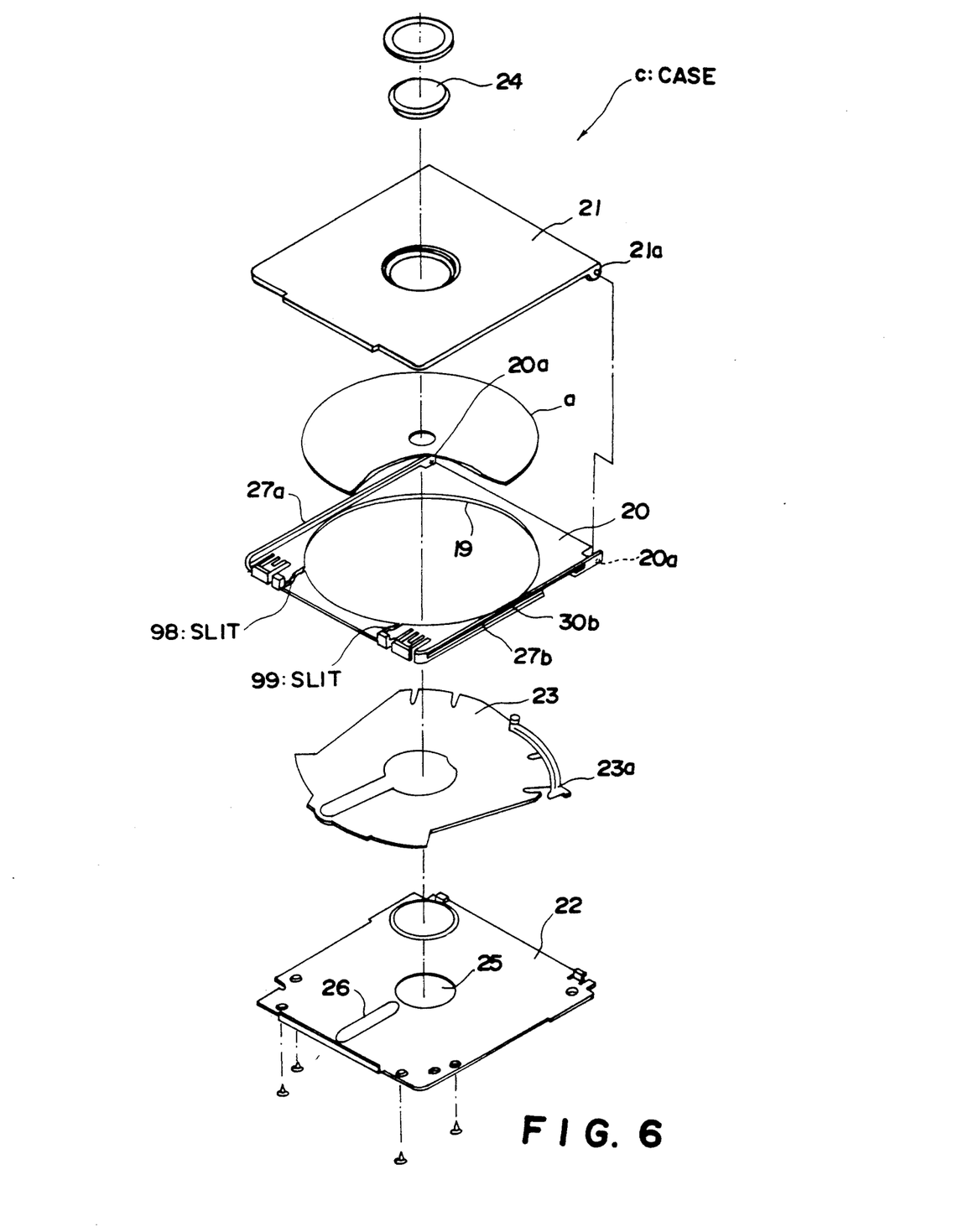
FIG. 6 is an explosive perspective view of the case.

FIG. 2 shows an example of such prior art adaptors. This adaptor 10 is constructed of an annular plate with a diameter of 12 cm, is formed with slits 15 in its inner peripheral portion, and also is formed with three tabs 11, 12 and 13. An 8-cm CD 14 is attached to the adaptor 10 by means of these tabs 11, 12 and 13. In attaching the 8-cm CD 14, the outer peripheral portion of the 8-cm CD 14 is held by the tab 11 and then by the tab 12 and then the third tab 13 is pulled outwardly by utilizing elasticity imparted to the adaptor 10 by the provision of the slits 15 to cause the 8-cm CD to be engaged by the third tab 13.

However, the prior art adaptor 10 has the following disadvantages:

i) Attaching and detaching of the 8-cm CD 14 are rather difficult and scratches and spots tend to occur on the 8-cm CD 14 during attaching and detaching.

ii) Since this adaptor 10 is rotated with the 8-cm CD 14 during playback of the 8-cm CD 14, the adaptor 10 tends to be disengaged from the 8-cm CD 14 with resulting damage to the 8-cm CD 14 or to the CD player.

iii) Since the prior art adaptor 10 is of such construction that the tabs 11, 12 and 13 respectively hold the 8-cm CD 14 vertically between their upper and lower projections, the portions of the 8-cm CD held by the tabs 11, 12 and 13 become three-layered structure and the thickness of these portions increases with a result that a standard thickness of 1.5 mm of a CD can no longer be maintained.

iv) The adaptor 10 must be attached and detached each time the 8-cm CD is changed.

v) Since the adaptor 10 is fixed to the 8-cm CD 14, a warp or deformation of the adaptor 10 produces a corresponding warp or deformation to the 8-cm CD 14 with resulting deterioration in the accuracy of reproduction.

It is, therefore, an object of the invention to provide an adaptor which facilitates attaching and detaching a disc and preventing disengagement of the adaptor from the disc during playback of the disc.

SUMMARY OF THE INVENTION

For achieving the above described object of the invention, there is provided an adaptor for a disc cartridge case having a disc housing space for receiving a disc so that it can be replaced and played back and being loaded in a disc playback device main body with the disc received therein for playback of the disc, said adaptor being used for a disc of a small diameter, being detachably mounted in the disc housing space of the disc cartridge case and comprising a central opening for receiving a disc of a small diameter therein in such a manner that this disc of a small diameter is roughly positioned and held in the central portion of the disc housing space so as to enable this disc to be set on a turntable of the disc playback device main body when the adaptor is mounted in the disc housing space, and self positioning means for positioning the adaptor with respect to the case so that the adaptor will be held in a position in which the adaptor is not in contact with the disc of a small diameter when the disc is set on the turntable.

According to the invention, the adaptor is housed in the disc housing space of the disc cartridge case constructed for a predetermined standard of disc and the disc of a small diameter is housed in the central opening of this adaptor in such a manner that the disc can be roughly positioned and held in the central portion of the disc housing space of the case. This structure ensures accurate setting of the disc of a small diameter on the turntable. In a state where the disc is set on the turntable, the adaptor is held by the self positioning means in a position in which it is not brought into contact with the disc and this ensures smooth rotation of the disc.

According to the invention, it is not necessary to attach the adaptor to a disc of a small diameter so that attaching and detaching of the disc are facilitated and occurrence of scratches and spots on the disc can be prevented. Further, the three-layered structure of the prior art adaptor in which a disc is held in the vertical direction with the tabs for attaching the disc to the adaptor is obviated so that an adaptor of a thin structure which can be readily housed in the currently available disc cartridge cases can be provided. Besides, since the adaptor according to the invention is housed in the disc cartridge case, disengagement and resulting damage of the adaptor in the disc playback device can be prevented.

Since the adaptor is not attached to a disc of a small diameter, a warp or deformation of the adaptor does not pose a problem to the disc so that a high precision of the adaptor is not required and this enables the adaptor to be manufactured at a reduced cost.

Preferred embodiments of the invention will now be described with reference to the accompanying drawings.

BRIEF DESCRIPTION OF THE DRAWINGS

In the accompanying drawings.

DESCRIPTION OF PREFERRED EMBODIMENTS

An embodiment of the invention will now be described. The adaptor in this embodiment enables an 8-cm CD to be mounted on a cartridge case for a 12-cm CD. The cartridge case shown in this embodiment is adapted to house a CD in such a manner that it can be replaced and played back and to be loaded with a CD housed therein in a CD player mounted in an automobile.

FIGS. 3 through 6 are diagrams showing the structure of a cartridge case C and FIGS. 7 through 10 are diagrams showing the structure of a CD player main body D which plays back a CD by using the case C.

Referring first to FIGS. 3 through 6, the disc cartridge case C will be described. The case C is generally of a plate-like member having a rectangular shape in a plan view and having a certain thickness. This case C includes a frame 20 having a disc placing portion 19 defining a disc housing space, a case lid 21 attached to the frame 20 so as to cover the upper surface of the disc placing portion 19, a bottom plate 22 fixedly secured to the frame 20 so as to cover the lower surface of the disc placing portion 19 and a shutter plate 23 disposed between the frame 20 and the bottom plate 22. A CD a is placed in the disc placing portion 19 in a state in which the CD a can be played back. The diameter of the disc placing portion 19 is made slightly larger (e.g., diameter of 122 mm) than the diameter of a CD. The case lid 21 has its pins 25, 25 loosely fitted in recesses 20a, 20a formed in the frame 20 and is pivotable about the pins 25, 25 in the directions of arrows P5 and P6 thereby opening and closing the disc placing portion 19 and enabling replacement of a CD a in the disc placing portion 19. A disc stabilizer 24 is mounted in the central portion of the case lid 21. This disc stabilizer 24 functions to hold the CD a in association with a turntable provided in the CD player main body D when the case C housing the CD a has been loaded in the main body D. The bottom plate 22 is formed with a turntable insertion opening 25 and a pickup head insertion slot 26.

There is also formed a pickup head insertion slot 81 at a position in the frame 20 corresponding to the outer end portion of the pickup head insertion slot 26.

The frame 20 is formed in its side surfaces 27a, 27b (i.e., in the side portions of the case C) with guide grooves 30a, 30b extending from a front end surface 28 (i.e., the end surface on the insertion side to the CD player main body D) to a point in the vicinity of a rear end surface 29 (i.e., the end surface on the non-insertion side to the CD player main body D). A loading rack 31 is formed on the bottom surface of the guide groove 30a. The frame 20 is formed in its lower front end portion on one side 27a with a synchronizing recess 32. This synchronizing recess 32 is provided for synchronizing meshing engagement between the rack 31 and a loading pinion provided in the CD player main body D, when the case C has been inserted in the main body D as will be described more in detail later. The stepped portion 32a of the recess 32 is located slightly forwardly of the starting end (i.e., a position of the first tooth) of the rack 31. By operating a shutter lever 23a which projects outside of one side portion of the frame 20, the shutter plate 23 is rotated in the directions of arrows P10 and P11 to open and close the pickup head insertion slot 26.

The frame 20 is formed with slits 98 and 99 for absorbing shrinkage of resin occurring in the frame 20. These slits 98 and 99 perform also a function of holding the adaptor elastically in the disc placing portion 19 as will be described more fully later.

The case C has curved surface portions in corner portions in one end thereof and uncurved surface portions in corner portions in the other end thereof and, by virtue of this peculiar configuration, is capable of being loaded in the CD player main body D only when it is inserted in a correct insertion posture and otherwise is rejected. More specifically, two corner portions defined by crossing of the front end surface 28 and the side surfaces 27a, 27b are formed in curved surface portions 33a, 33b which gradually approach each other from the side surfaces 27a, 27b towards the front end surface 28. On the other hand, two corner portions defined by crossing of the rear end surface 29 and the side surfaces 27a, 27b are formed in uncurved surface portions 34a, 34b formed by crossing of the rear end surface 29 and the side surfaces 27a, 27b at right angles which respectively assume an L shape as viewed in plan. The synchronizing recess 32 also constitutes an uncurved surface portion.

Figure 7:
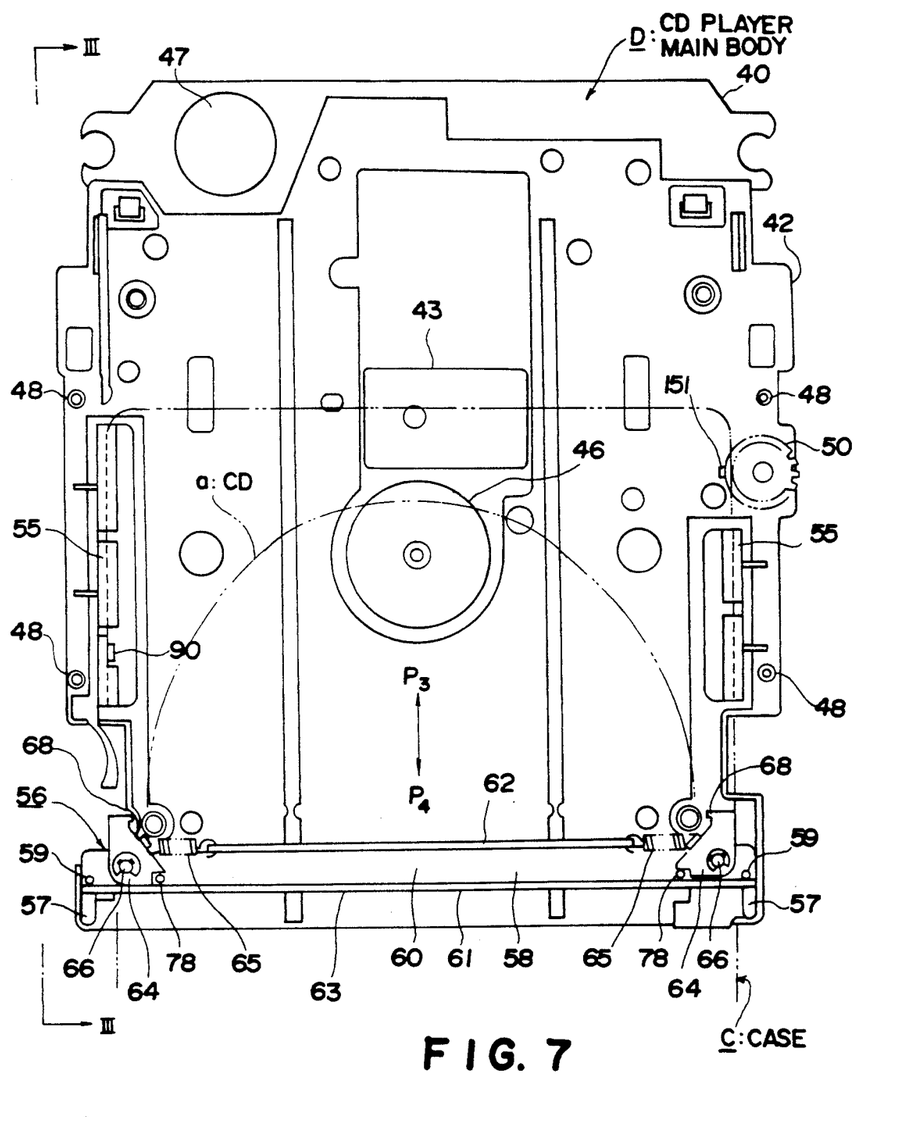
FIG. 7 is a plan view showing an example of internal construction of a CD player in which the disc cartridge case is loaded.
Figure 8:
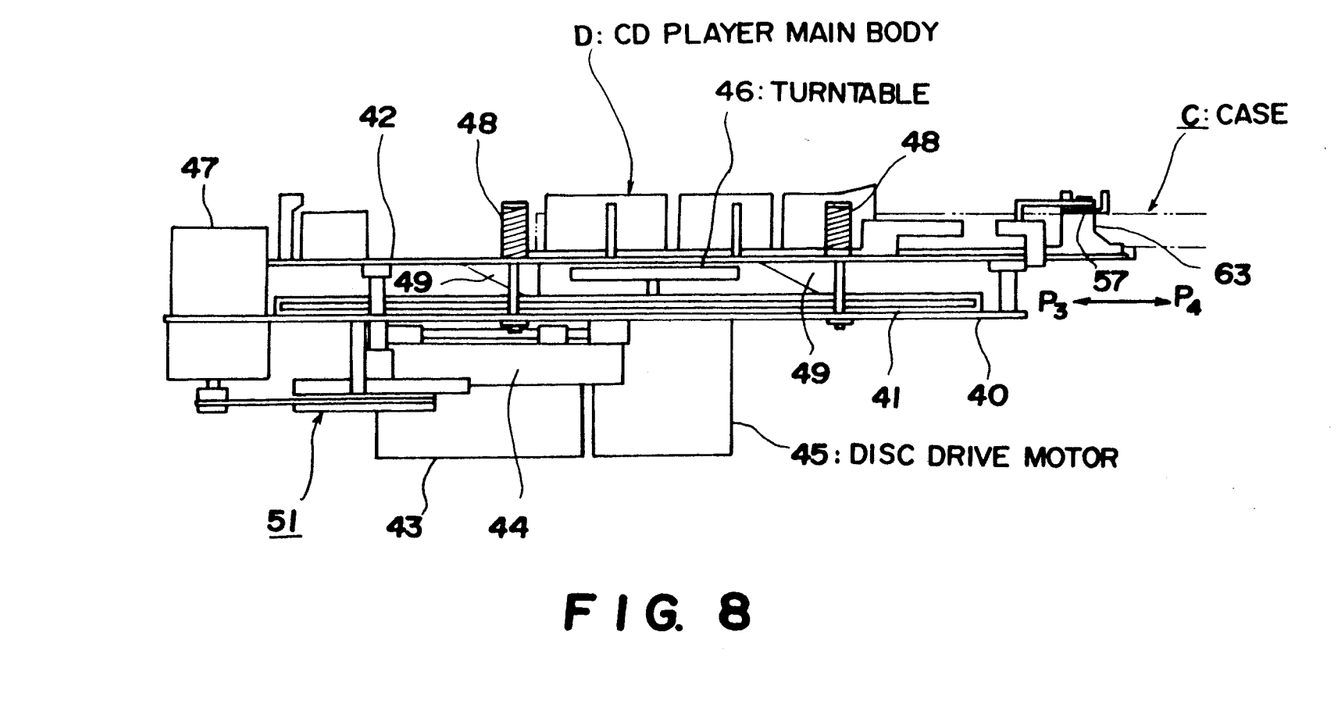
FIG. 8 is a view taken along lines III—III in FIG. 7.

Referring now to FIGS. 7 through 10, the CD player main body D will be described. In FIGS. 7 and 8, reference numeral 40 denotes a chassis. A carrier 41 and a disc cartridge case holder 42 are provided above the chassis 40 and a head base 44 carrying a pickup head 43 is provided beneath the chassis 40.

A disc drive motor 45 is secured on the lower surface of the chassis 40 and a turntable 46 is connected to a rotation shaft of the motor 45. A feed loading motor 47 is also secured to the chassis 40. The carrier 41 is disposed on the upper surface of the chassis 40 displaceably in the directions of arrows P3 and P4. The holder 42 is supported vertically movably on the upper surface of the chassis 40 above the carrier 41. The holder 42 is constantly urged downwardly by springs 48, 48, is at its uppermost position when the cams 49, 49 . . . formed in the lower surface thereof is in abutting engagement with the upper surface of the carrier 41, and moves downwardly when the cams 49, 49 . . . enter holes (not shown) formed in both the carrier 41 and the chassis 42. On this holder 42 is mounted a loading pinion 50 which meshes with the loading rack 31 of the case C. On the pinion 50 is provided a synchronizing projection 151 for synchronizing meshing engagement between the pinion 50 and rack 31 when the pinion 50 meshes with the rack 31 as will be described later.

In the above described device, the feed loading motor 47 is provided for driving the head base 44 in the direction of arrows P3 and P4 through a driving force transmission means 51. When the head base 44 has moved in these directions, the carrier 41 moves in the same directions with the head base 44 thereby moving the holder 42 in the vertical direction and rotating the loading pinion 50 through an unillustrated driving force transmission means. During playing back of the CD a, the holder 42 holds the case C housing the CD a and thereby places the CD a on the turntable 46. The loading pinion 50 meshes with the rack 31 of the case C during loading and ejection of the case C and thereby moves the case C in the directions of arrows P3 and P4.

On the holder 42 are provided guide walls 55, 55 on both side portions thereof for guiding the case C in the directions of arrows P3 and P4 during the movement of the case C. On the holder 42 is also provided erroneous insertion prevention means 56 for preventing an erroneous insertion of the case C in cooperation with the case C.

Figure 9:
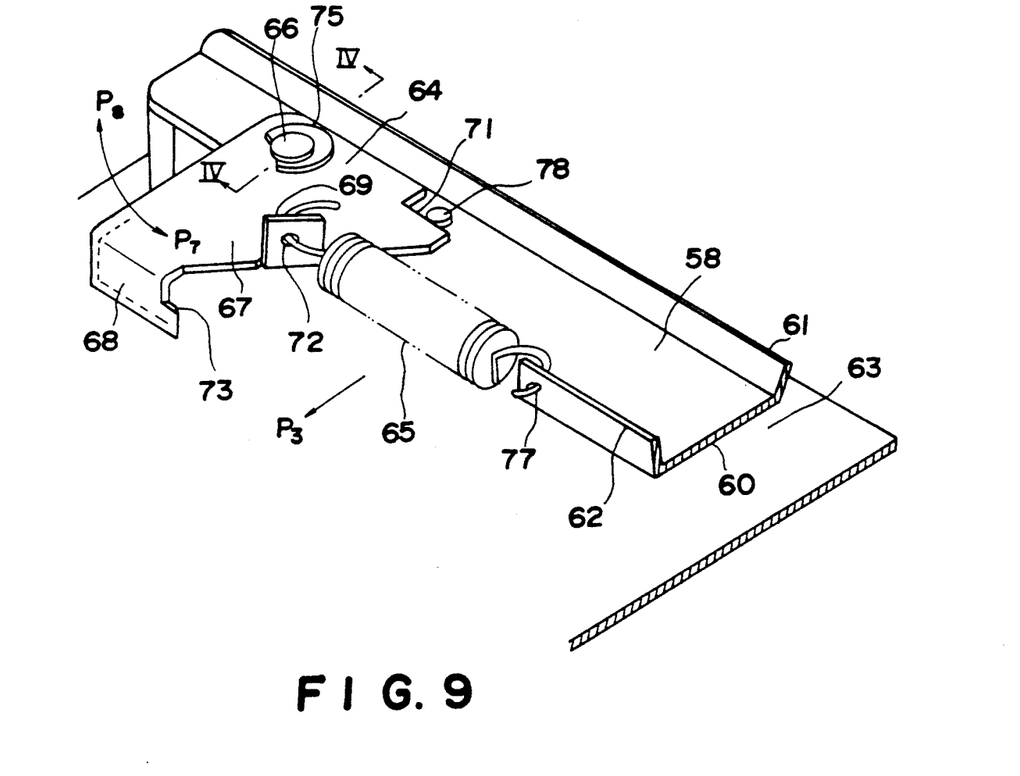
FIG. 9 is an enlarged perspective view of a part of the CD player.

More specifically, upwardly projecting supports 57, 57 are secured on both sides of the upper surface of the front end portion of the holder 42. A frame 58 is secured on the upper surface of the supports 57, 57 by means of screws 59, 59. The frame 58 is generally of a plate-like configuration and, as shown in FIGS. 7 and 9, its main portion 60 extending in the direction crossing the direction P3 is formed with a guide wall portion 61 projecting upwardly and obliquely from the front end portion of the main portion 60 and also with a reinforcing wall portion 62 projecting upwardly from the rear end portion of the main portion 60. A space defined by this frame 58 and the front end portion of the holder 42 constitutes a disc cartridge case insertion opening 63. On both sides of the upper surface of the frame 58 are mounted case erroneous insertion blocking members 64, 64 and springs 65, 65 for biasing these blocking members 64, 64.

Figure 10:
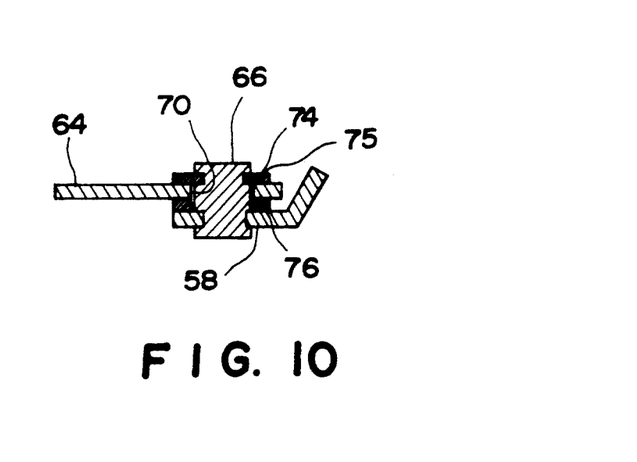
FIG. 10 is a sectional view taken along lines IV—IV in FIG. 9.

FIGS. 9 and 10 show configurations and a manner of mounting of the case erroneous insertion blocking member 64 and the spring 65 on one side only. As shown in these figures, an upwardly projecting pivot 66 is fixedly secured on the end portion of the frame 58 and the case erroneous insertion blocking member 64 is mounted on this pivot 66 rotatably in the directions of arrows P7 and P8. The case erroneous insertion blocking member 64 is formed by cutting and folding a plate into a predetermined shape. The blocking member 64 has a main portion 67 of a generally triangular shape as viewed in plan, an engaging portion 68 extending downwardly from the rear end of the main portion 67 and a spring engaging wall 69 projecting upwardly from one side edge of the main portion 67. The main portion 67 is formed with an opening 70 for mounting the blocking member 64 on the pivot 66 and a recess 71 and the spring engaging wall 69 is formed with a hole 72. The engaging portion 68 has an edge portion 73 having a curved surface on the inner side thereof. The blocking member 64 is mounted on the frame 58 with the engaging portion 68 being positioned rearwardly of the frame 58 and the pivot 66 being inserted in the opening 70. The blocking member 64 is prevented from slipping upwardly by means of a retainer 75 fitted in an annular groove 74 formed in the pivot 66. A washer 76 is interposed between the blocking member 64 and the frame 58. The spring 65 is secured in one end thereof to the hole 72 of the spring engaging wall 69 and in the other end thereof to a hole 77 formed in the reinforcing wall portion 62. This arrangement causes the blocking member 64 to be urged by the spring 65 in the direction of arrow P7. The blocking member 64 however is stopped at a predetermined position, namely a position in which the front end surface of the engaging portion 68 crosses at right angles with the direction in which the case C is inserted (i.e., the direction of arrow P3), by abutting of the recess 71 with a projection 78 provided on the upper surface of the frame 58.

The blocking member 64 provided on the other side of the frame 58 is of a configuration symmetrical with the above described blocking member 64 and is symmetrically mounted on the frame 58 with the other spring 65.

For playing back the CD a by disc cartridge case C and the CD player main body D, the CD a is housed in the disc cartridge case C and this case C is manually inserted from the insertion openings 63 of the CD player main body D into the holder 42 in its uppermost position. At this time, the case C assumes a posture in which the case lid 21 is facing upwardly and the front end surface 28 is constituting the end surface from which the case C is inserted into the holder 42. In inserting the case C, this correct insertion posture of the case C can be readily recognized with the eye because the curved surface portions 33a, 33b on the insertion side of the case C have a different shape from the uncurved surface portions 34a, 34b on the non-insertion side thereof.

The case C is manually inserted into the holder 42 to a position in which the leading end of the rack 31 of the case C comes into meshing engagement with the loading pinion 50. In the meshing engagement between the rack 31 and the pinion 50, the stepped portion 32a of the synchronizing recess 32 of the case C abuts against the projection 151 of the pinion 50 and thereby rotates the pinion 50 by a predetermined angle and sets the pinion 50 in a predetermined position relative to the rack 31. The leading end portion of the rack 31 therefore meshes always smoothly with the pinion 50. When the rack 31 has meshed with the loading pinion 50, an unillustrated detection switch detects this state and causes the feed loading motor 47 to be switched on.

As the motor 47 has been switched on, the head base 44 is moved in the direction of arrow P3 through the driving force transmission means 51 and the carrier 41 thereby is moved in the same direction. The movement of the carrier 41 causes the pinion 50 to be rotated which in turn causes the case C whose rack 31 is in mesh with the pinion 50 to be moved in the direction of arrow P3. As the case C is moved in this manner and the CD a housed therein approaches the position above the turntable 46, the cams 49, 49, ... of the holder 42 gradually enter the unillustrated holes of the carrier 41 and the chassis 40 thereby lowering the holder 42. The lowering of the holder 42 causes the turntable 46 to enter relatively the inside of the case C through the turntable insertion opening 25 and support the CD a disposed in the case C. The CD a is now held between the disc stabilizer 24 disposed above and the turntable 46 disposed thereunder. Upon completion of holding of the CD a, the associated movement of the carrier 41 and the loading pinion 50 is terminated and the pinion 50 stop its rotation.

In the meanwhile, upon reaching of the head base 44 to a predetermined position in the direction of arrow P3, this state is detected by an unillustrated detection switch and the feed loading motor 47 thereby is rotated reversely to move the head base 44 to the direction of arrow P4. At this time, the associated movement of the carrier 41 and the head base 44 is terminated and the carrier 41 remains unmoved. When the pickup head 43 has reached the lead-in position by the movement of the head base 44 in the direction of arrow P4, this state is detected by an unillustrated detection switch and the movement of the head base 44 thereby is stopped.

Thus, the CD player main body D is now in a state in which the CD a can be played back. Upon receiving of a play command, the disc drive motor 45 is rotated to turn the CD a with the turntable 46. In the meanwhile, the feed loading motor 47 supplies power for the feed operation feeding the head base 44 at a proper speed in the direction of arrow P3 in response to the play command. The pickup head 43 mounted on the head base 44 therefore picks up signals recorded on the CD a through the pickup head insertion slot 26 whereby playback of the CD a is performed.

Figure 1:
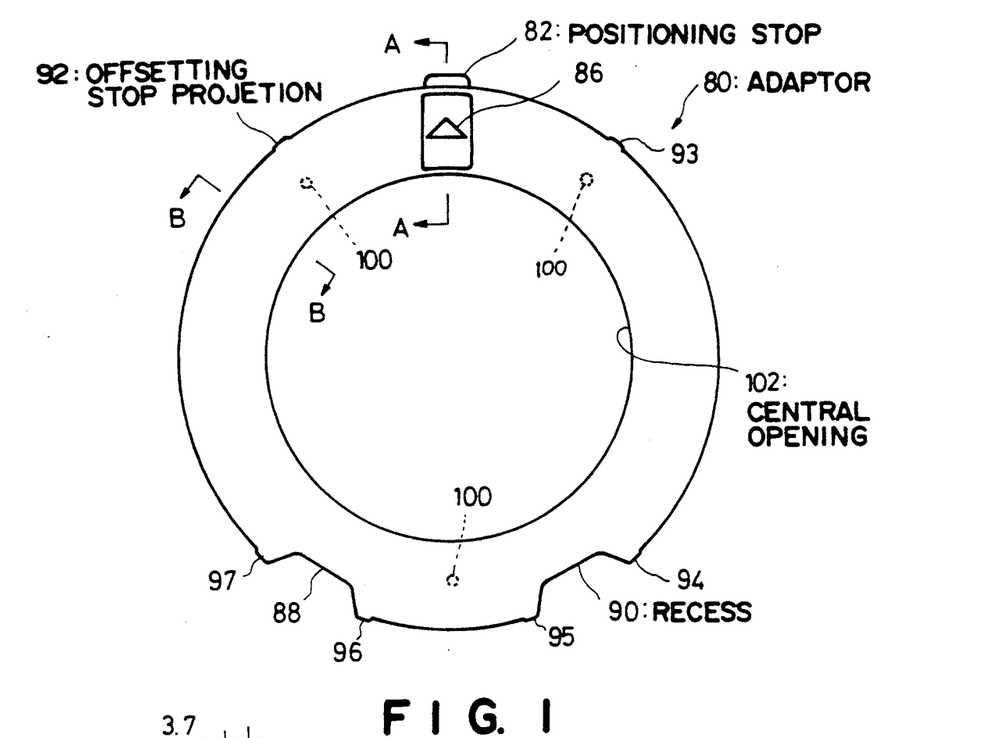
FIG. 1 is a plan view showing an embodiment of the invention.
Figure 11:
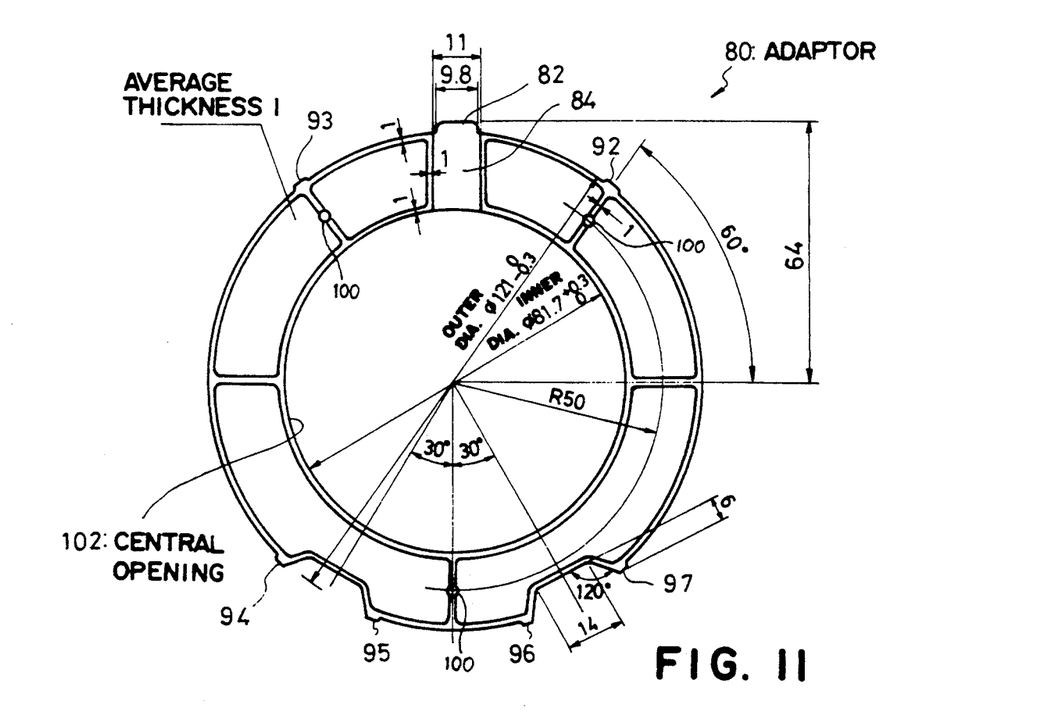
FIG. 11 is a bottom view of the adaptor of FIG. 1.
Figure 12:
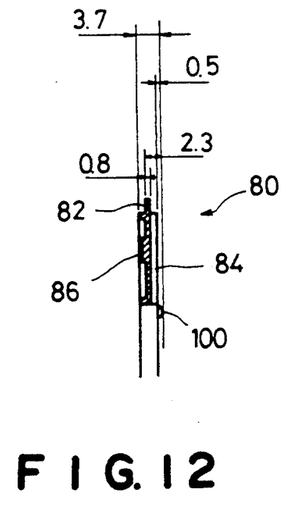
FIG. 12 is a sectional view taken along lines A—A in FIG. 1.
Figure 13:
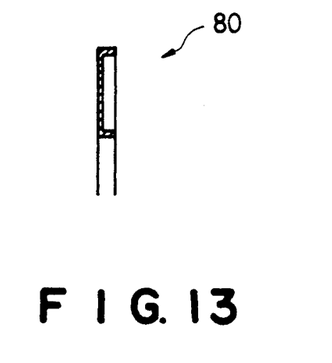
FIG. 13 is a sectional view taken along lines B—B in FIG. 1.

Description will now be made about an embodiment of an adaptor for housing an 8-cm CD in the above described disc cartridge case C. FIG.1 is a plan view of the adaptor and FIG. 11 is a bottom view thereof. FIGS. 12 and 13 are views taken along lines A—A and B—B in FIG. 1.

This adaptor 80 is formed annularly of high-temperature resistant ABS resin or the like material. The adaptor 80 is of such an outer diameter that the adaptor 80 can be mounted detachably in the disc placing portion 19 (FIG. 5) of the case C. The central opening 102 of the adaptor 80 has an inner diameter which is slightly larger than the outer diameter of an 8-cm CD so that the 8-cm CD can be received in the central opening 102. The central opening 102 houses an 8-cm CD in such a manner that it is roughly positioned in the central portion of the disc placing portion 19 so that it is set on the turntable 46 of the CD player main body D.

On the outer periphery of the adaptor 80 are formed recesses 88 and 90 for fitting the operator's fingers therein for facilitating attachment and detachment of the adaptor 80 has self positioning means for The adaptor 80 has self positioning means for positioning the adaptor 80 itself to the case C so that the adaptor 80 is held in a position in which the adaptor 80 is not in contact with an 8-cm CD in a state where the 8cm CD is set on the turntable 46. In this embodiment, the self-positioning means is constructed of offsetting stop projections 92 through 97 formed on the outer periphery of the adaptor 80. These offsetting stop projections 92 through 97 causes the adaptor 80 to abut against the peripheral wall of the disc placing portion 19 of the case C when the adaptor 80 is placed in the disc placing portion 19 thereby holding the adaptor 80 in position and preventing it from offsetting from the position. Among these offsetting stop projections 92 through 97, the projections 94 through 97 are formed on both sides of recesses 88 and 90 and the projection 92 and 93 are formed in positions in which they abut against portions in the vicinity of the inner sides of the slits 98 and 99 (FIG. 5) of the case C. By forming the projections 92 and 93 in these positions, the frame 20 is flexed, due to existence of the slits 98 and 99, in the portion against which the offsetting stop projections 92 and 93 are in abutting engagement whereby the adaptor 80 is held elastically by the frame 20 so that offsetting of the adaptor 80 can be prevented.

On the outer periphery of the adaptor 80 is provided a positioning stop 82 for preventing the adaptor 80 from rotating when it is disposed in the disc placing portion 19. This positioning stop 82 is inserted into a pickup head insertion opening 81. (FIG. 5) formed in the frame 20 of the case C and serves to stop rotation of the adaptor 80. Since the laser beam from the pickup head displaces in the radial direction in the position of this positioning stop 82, a recess 84 for allowing displacement of the lens is formed in the radial direction in the bottom portion of the adaptor 80 as shown in the section of FIG. 12. A setting mark 86 is also formed above the recess 84 for indicating that the adaptor 80 should be set with this mark 86 facing upside.

A shutter slide projection 100 in the form of a semi-spherical projection is provided on the bottom surface of the adaptor 80. When the adaptor 80 is received in the case C, this shutter slide projection 100 serves to support the adaptor 80 on the shutter plate 23 by a point contact and thereby reduce friction between the adaptor 80 and the shutter plate 22 and allow free sliding movement of the shutter plate 23.

Figure 14:
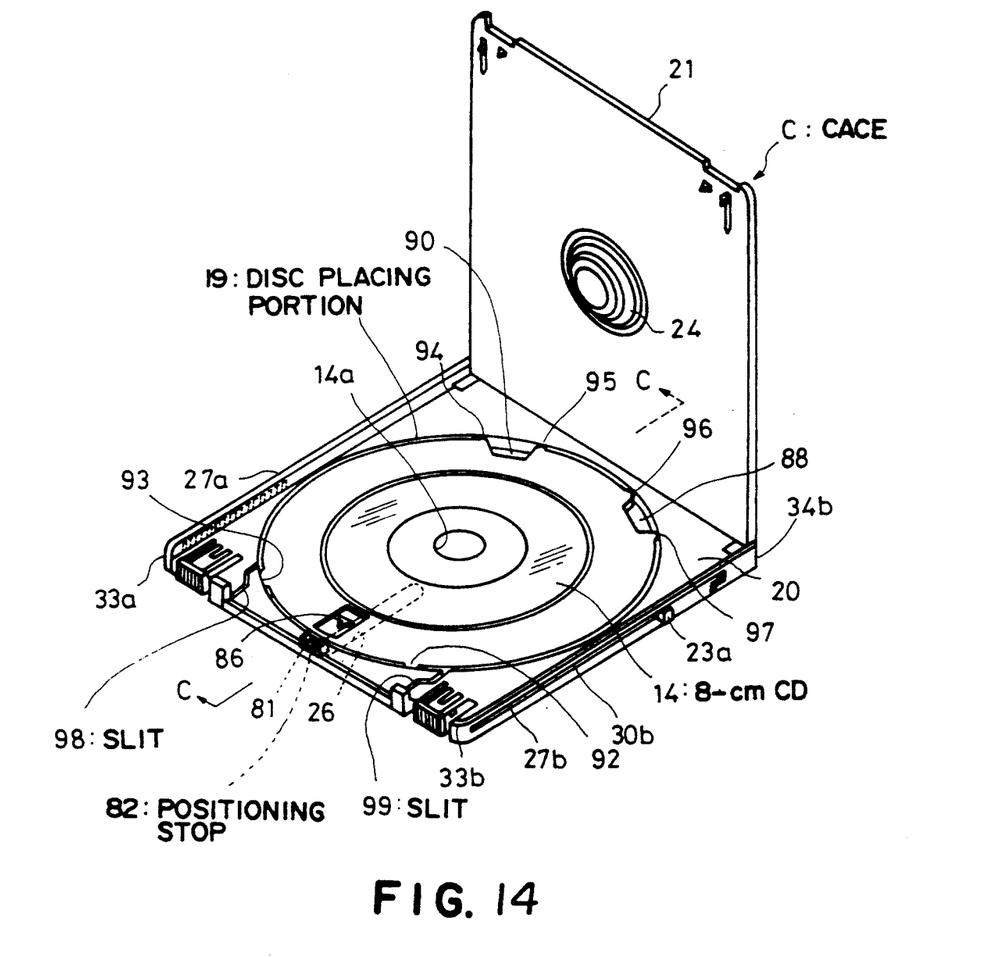
FIG. 14 is a perspective view showing a state where the adaptor of FIG. 1 is received in the case of FIG. 3 and an 8-cm CD is set in the adaptor.
Figure 15:
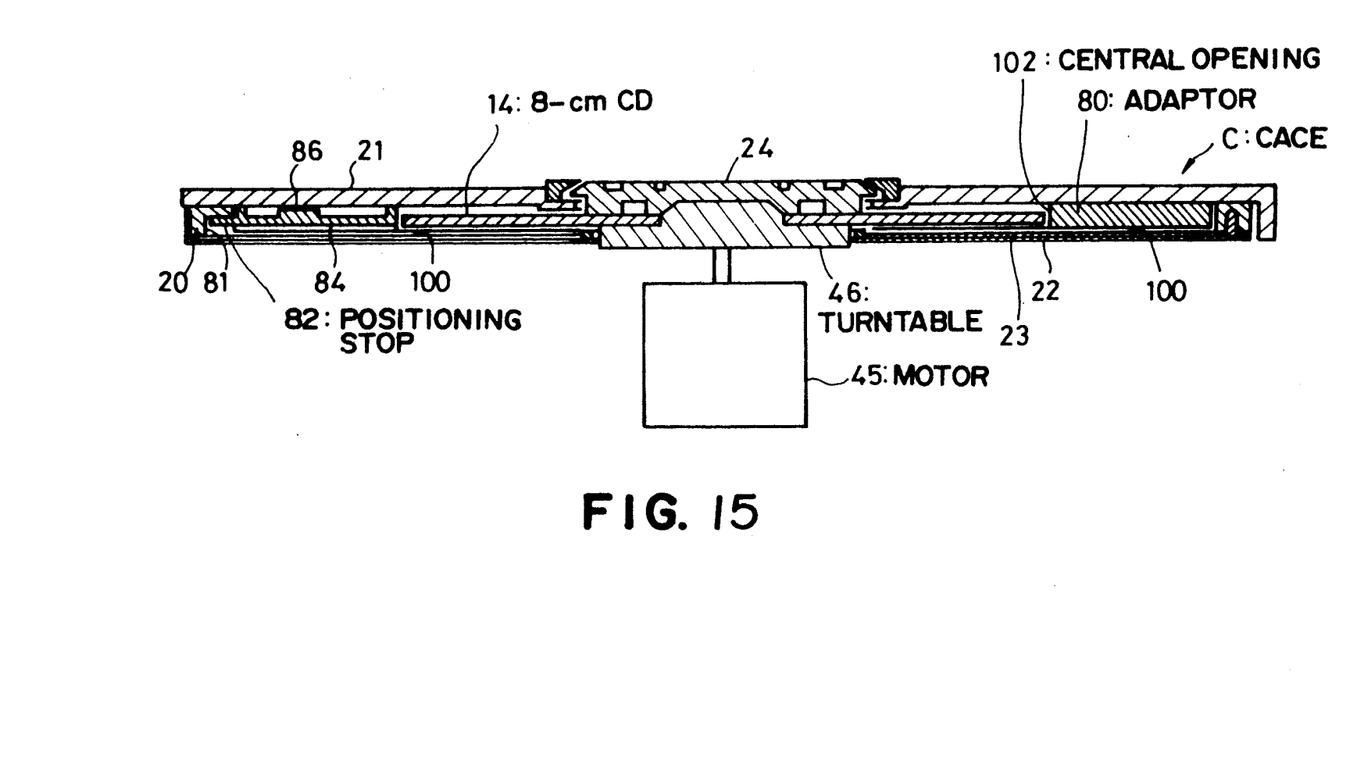
FIG. 15 is a sectional view taken along lines C—C in FIG. 14 showing a state where the case is set in the CD player.

A state where an 8-cm CD is set in the case C by using the above described adaptor 80 is shown in FIG. 14. A sectional view taken along lines C—C of FIG. 14 with the case lid 21 closed is shown in FIG. 15. Receiving and setting of an 8-cm CD 14 are performed in the following manner. First, the adaptor 80 is set in the disc placing portion 19 of the case C. In setting the adaptor 80, the operator picks up the adaptor 80 by fitting his fore finger and middle finger in the recesses 90 and 88 and fitting his thumb in the inner periphery of the adaptor 80 in a portion between these recesses 90 and 88. Then, he inserts the positioning stop 82 into the pickup insertion opening 81 (FIG. 5) to set the side of the positioning stop 82 of the adaptor 80 in the disc placing portion 19. Then he pulls the adaptor 80 slightly forwardly to cause the offsetting stop projections 92 and 93 to press the frame 20 which in turn is flexed in this portion due to the provision of the slits 99 and 98. Thereafter, he lowers the adaptor 80 on the side of the recesses 88 and 90 and the adaptor 80 can be completely set in the disc placing portion 19. In the set position, the adaptor 80 is prevented from rotation by the positioning stop 82. The adaptor 80 can also be held without offsetting owing to the elasticity of the frame 20 provided by the provision of the slits 98 and 99.

By placing the 8-cm CD 14 in the central opening 102 of the adaptor 80 in this state, the 8-cm CD 14 is set in the central portion of the case C. Then the case lid 21 is closed and the case C is inserted into the CD player main body D. The turntable enters the central opening 14a of the 8-cm CD 14 and supports the 8-cm CD 14 in a lifted state in the case C. The motor 45 is rotated and the objective lens of the pickup is positioned in the head insertion opening 26. Then the laser beam is irradiated on the recorded surface of the 8-cm CD 14 whereby playback of the 8-cm CD 14 is performed. In the state where the 8-cm CD has been set on the turntable 46, as shown in the section of FIG. 15, the 8-cm CD 14 is supported in a lifted stated in the case C. Further, since the central opening 102 is formed slightly larger than the outer diameter of the 8cm CD 14 and the adaptor 80 is held in position by the offsetting stop projections 92 through 97, the 8-cm CD 14 can be smoothly rotated without being brought into contact with the inner peripheral wall of the central opening 102.

By pushing an eject button (not shown) of the CD player main body D after finishing the playback of the 8-cm CD 14, the case C can be taken out of the CD player main body D. By opening the case lid 21, the 8-cm CD 14 can be readily replaced. If it is desired to play back a 12-cm CD, the adaptor 80 can be readily detached after removing the 8-cm CD by pulling the adaptor 80 slightly forwardly by holding it at the recesses 88 and 90 with the operator's fingers.

In the above described embodiment, the rotation of the adaptor 80 is prevented by the provision of the positioning stop 82. The scope of the invention however is not limited to this. If the adaptor 80 is positioned and held with respect to the case C in such a manner that the adaptor 80 is not brought into contact with the 8-cm CD 14 when the 8-cm CD is set on the turntable 46, the adaptor 80 will not be rotated.

In the above described embodiment, offsetting of the adaptor 80 is prevented by the provision of the offsetting stop projections 92 through 97. It is however not necessary to provide such offsetting prevention means if the adaptor is used for a fixed type CD player which is not mounted in an automobile or not of a portable type. In case the offsetting stop projections 92 through 97 are not provided, the outer periphery of the adaptor 80 constitutes the self positioning means and, accordingly, the adaptor 80 should be formed in such an outer diameter that the adaptor 80 will not be brought into contact with the 8-cm CD 14 when the 8-cm CD 14 is set on the turntable 46.

Figure 16:
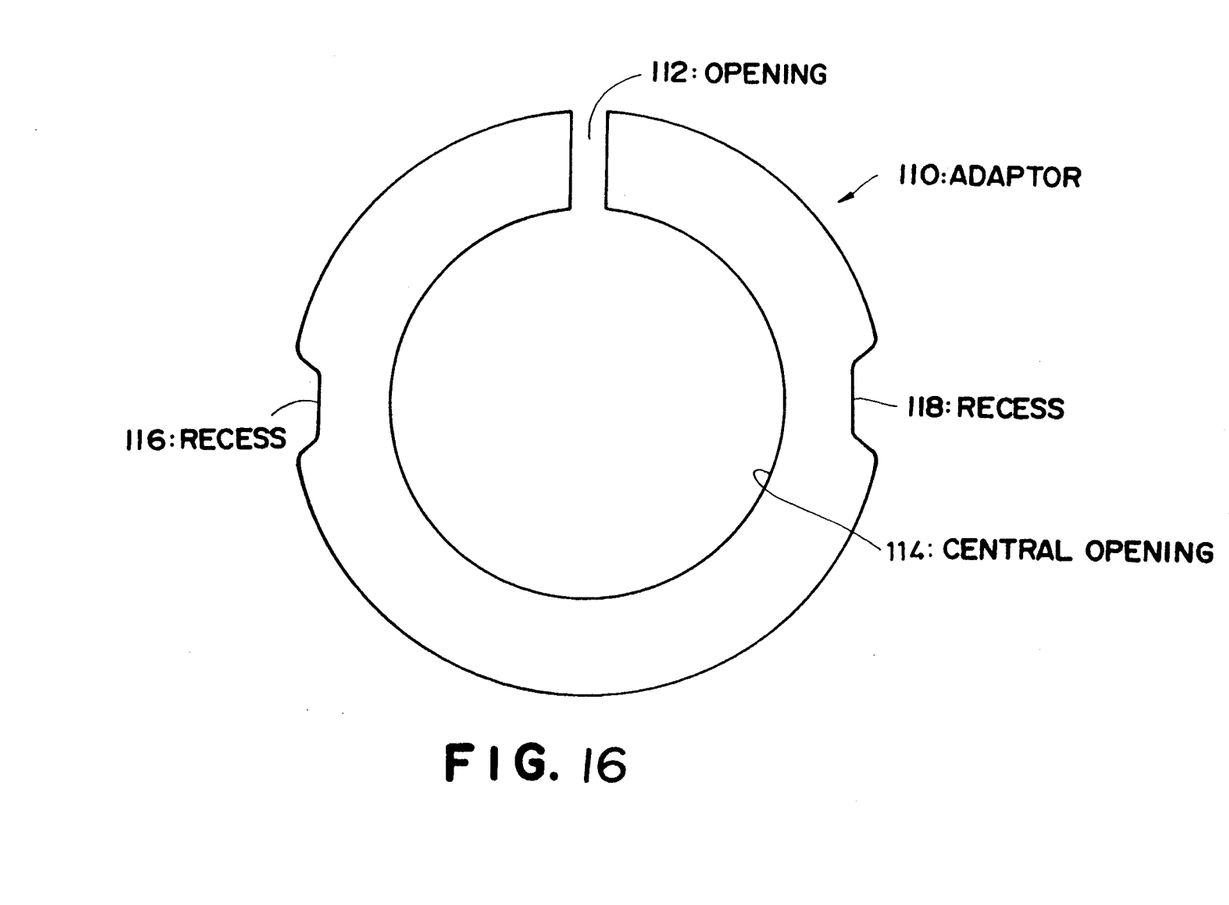
FIG. 16 is a plan view showing another embodiment of the invention.

In the above described embodiment, the adaptor 80 has an annular configuration. Alternatively, the adaptor 80 may be of a configuration such as an adaptor 110 shown in FIG. 16 in which a part of the ring is cut off to form an opening 112. In this case, offsetting of the adaptor 110 can be prevented by forming the outer diameter thereof slightly larger than the inner diameter of the disc placing portion 19 of the case C. For setting the adaptor 110 in the disc placing portion 19, the ring of the adaptor 110 is reduced slightly in its diameter by pressing it at recesses 116 and 118 with the operator's fingers and then the adaptor 110 is received in the disc placing portion 19. By releasing the fingers, the ring of the adaptor 110 is restored elastically to its normal diameter and is held stably in the disc placing portion 19. In this case, therefore, the self positioning means consists of the outer peripheral portion of the adaptor 110 which is elastically pressed against the peripheral wall of the disc placing portion 19.

The shape of the adaptor is not limited to the above described ones but various other shapes may be designed according to the disc receiving space of the case C or other factors.

The invention is applicable not only to an adaptor for setting an 8-cm CD in a cartridge case for a 12-cm CD but also to combinations of various other disc cases and various other discs.

What is claimed is:

1. An adaptor for a disc cartridge case having a disc housing space for receiving a disc interchangeably, the disc being played back therein and being loaded in a disc playback device main body with the disc received therein for playback of the disc, said adaptor being used for a disc of a small diameter, being detachably mounted in the disc housing space of the disc cartridge case and comprising:

a generally annular body;
   a central opening in the body for receiving a disc of a small diameter therein, the disc of a small diameter being roughly positioned in the central portion of the disc housing space, and the disc being set on a turntable of the disc playback device main body when the adaptor is mounted in the disc housing space; and
   self positioning means for positioning the adaptor with respect to the case such that the adaptor is held in position by the case and does not contact the disc when the disc is set on the turntable.

2. An adaptor as defined in claim 1 wherein said adaptor is of an annular configuration and said self positioning means consists of offsetting stop projections formed on the outer periphery of the adaptor for causing the adaptor to abut against the peripheral wall of the disc housing space.

3. An adaptor as defined in claim 1 wherein said adaptor is of an annular configuration and wherein said self positioning means consists of the outer periphery of the adaptor.

4. An adaptor as defined in claim 1 wherein said adaptor is of an annular configuration with a part thereof being cut off and has a diameter which is slightly larger than the diameter of the disc housing space and wherein said self positioning means consists of the outer peripheral portion of the adaptor which is elastically pressed against the peripheral wall of the disc housing space.

5. An adaptor as defined in claim 1 wherein said adaptor is formed with recesses in which an operator's fingers can be fitted for holding the adaptor.

6. An adaptor as defined in claim 1 further comprising a positioning stop operating in association with said disc cartridge case for preventing rotation of said adaptor.

* * * * *